USO10007504B2

(12) United States Patent
Blaschke et al.

(10) Patent No.: US 10,007,504 B2
(45) Date of Patent: Jun. 26, 2018

(54) MODULAR SUBSYSTEM FOR A VEHICLE FOR UPDATING AND DEVICE MANAGEMENT

(71) Applicant: Robert Bosch GmbH, Stuttgart (DE)

(72) Inventors: Volker Blaschke, Bietigheim-Bissingen (DE); Gafur Zymeri, Hannover (DE); Klaus Schneider, Ludwigsburg (DE); Ralf Luebben, Osterode (DE)

(73) Assignee: ROBERT BOSCH GMBH, Stuttgart (DE)

( * ) Notice: Subject to any disclaimer, the term of this patent is extended or adjusted under 35 U.S.C. 154(b) by 106 days.

(21) Appl. No.: 15/052,743

(22) Filed: Feb. 24, 2016

(65) Prior Publication Data
US 2016/0259639 A1   Sep. 8, 2016

(30) Foreign Application Priority Data

Mar. 3, 2015   (DE) .................. 10 2015 203 766

(51) Int. Cl.
*G06F 9/44*   (2018.01)
*G06F 8/65*   (2018.01)

(52) U.S. Cl.
CPC ..................... *G06F 8/65* (2013.01)

(58) Field of Classification Search
CPC ........................................................ G06F 8/65
USPC ......................................................... 717/173
See application file for complete search history.

(56) References Cited

U.S. PATENT DOCUMENTS

| | | | | |
|---|---|---|---|---|
| 8,423,017 | B2* | 4/2013 | Haralson | H04W 8/30 340/5.72 |
| 8,813,061 | B2* | 8/2014 | Hoffman | G06F 8/65 717/168 |
| 9,086,941 | B1* | 7/2015 | Siegel | G06F 8/65 |
| 9,128,798 | B2* | 9/2015 | Hoffman | G06F 8/65 |
| 9,298,649 | B2* | 3/2016 | Pandya | G06F 8/65 |
| 9,348,577 | B2* | 5/2016 | Hoffman | G06F 8/65 |
| 9,648,023 | B2* | 5/2017 | Hoffman | H04L 63/102 |
| 9,766,874 | B2* | 9/2017 | Rork | G06F 8/65 |
| 9,841,970 | B2* | 12/2017 | Vangelov | G06F 8/654 |
| 2009/0300595 | A1* | 12/2009 | Moran | G06F 8/65 717/170 |
| 2011/0307336 | A1* | 12/2011 | Smirnov | G06F 8/64 705/14.62 |
| 2011/0320089 | A1* | 12/2011 | Lewis | G01C 21/32 701/29.6 |

(Continued)

FOREIGN PATENT DOCUMENTS

DE          10105454          8/2002

*Primary Examiner* — Francisco Aponte
(74) *Attorney, Agent, or Firm* — Norton Rose Fulbright US LLP; Gerard Messina

(57) ABSTRACT

A subsystem for a vehicle includes a device management client for exchanging device, vehicle, and diagnostic as well as software update information, which is connected to a device management server of the back-end via an air interface, a download client for downloading a software update from the back-end into the vehicle, which is connected to a download server of the back-end via an air interface, software update clients for applying the software update, which are connected to the download client and a vehicle update client for coordinating the software update, which is connected to the download client and the software update clients.

11 Claims, 2 Drawing Sheets

(56) References Cited

U.S. PATENT DOCUMENTS

| | | | |
|---|---|---|---|
| 2014/0006555 A1* | 1/2014 | Shields | H04L 67/12 709/217 |
| 2014/0282470 A1* | 9/2014 | Buga | G06F 8/65 717/170 |
| 2015/0007155 A1* | 1/2015 | Hoffman | G06F 8/65 717/168 |
| 2015/0095898 A1* | 4/2015 | Mitchell | G06F 8/65 717/168 |
| 2015/0242198 A1* | 8/2015 | Tobolski | G06F 8/61 717/172 |
| 2016/0197932 A1* | 7/2016 | Hoffman | H04L 63/102 726/4 |
| 2016/0378457 A1* | 12/2016 | Adachi | G06F 9/445 713/181 |

* cited by examiner

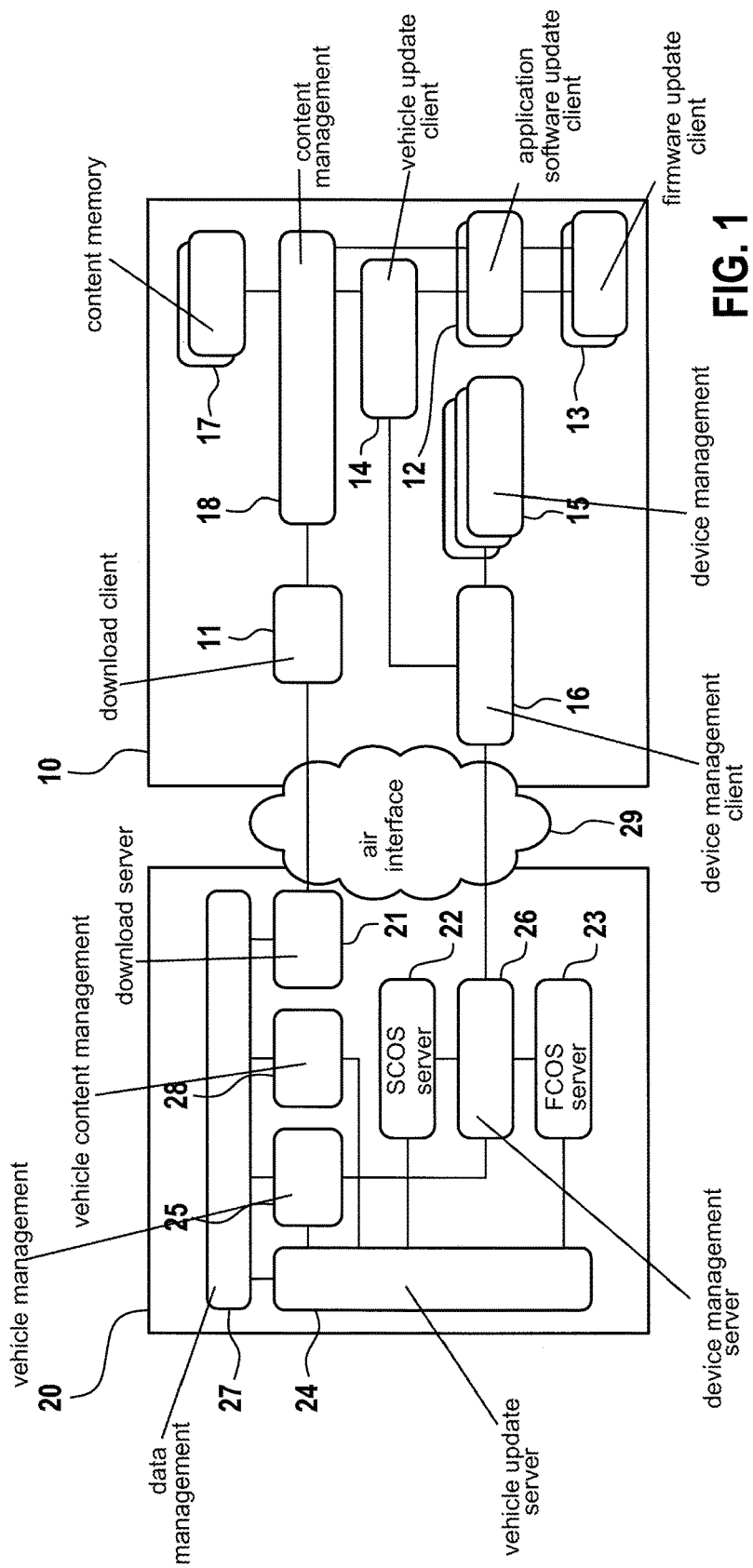

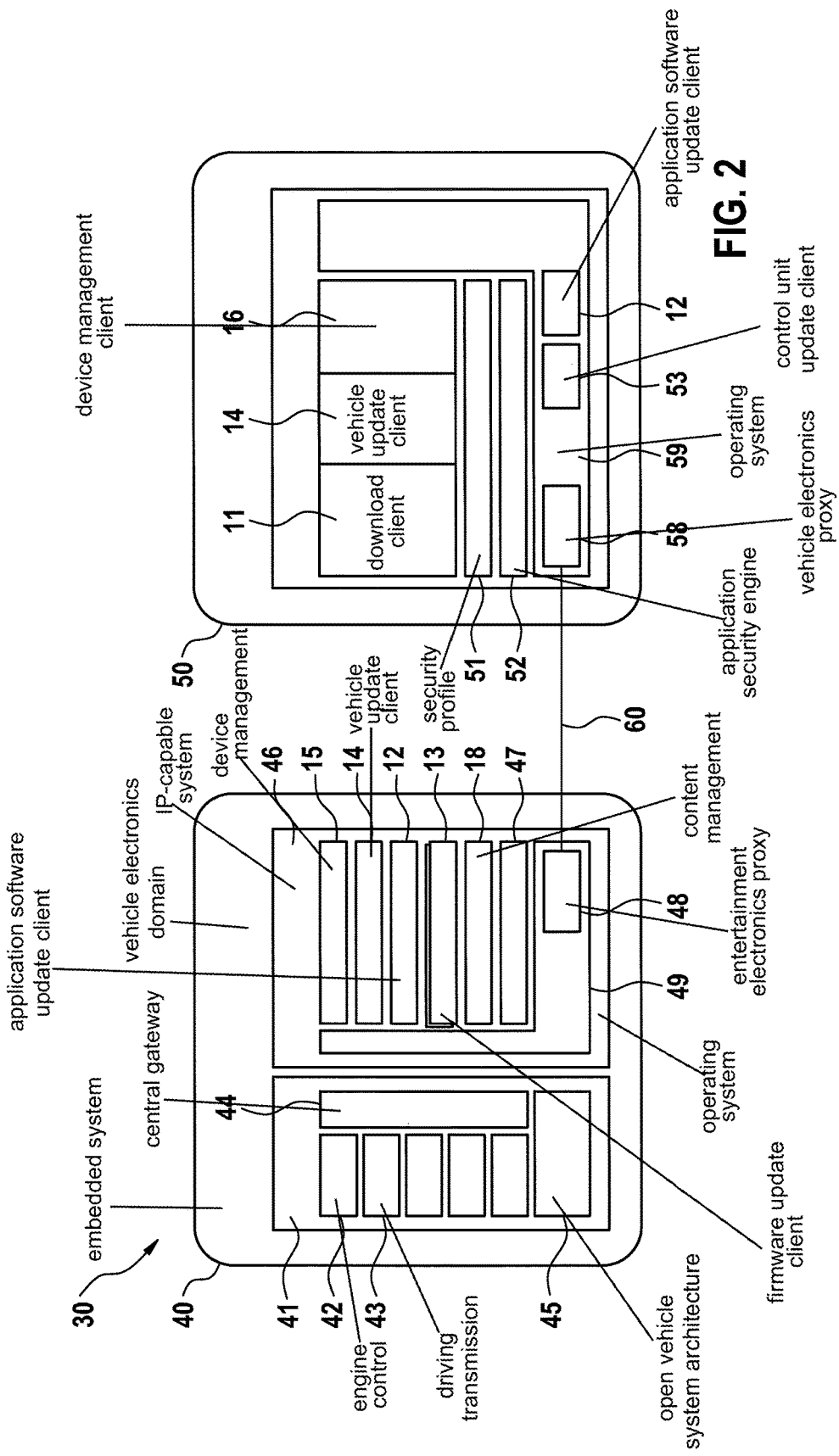

MODULAR SUBSYSTEM FOR A VEHICLE FOR UPDATING AND DEVICE MANAGEMENT

CROSS REFERENCE

The present application claims the benefit under 35 U.S.C. § 119 of German Patent Application No. 102015203766.5 filed on Mar. 3, 2015, which is expressly incorporated herein by reference in its entirety.

FIELD

The present invention relates to a subsystem for a vehicle. The present invention further relates to a correspondingly equipped vehicle.

BACKGROUND INFORMATION

In radio technology, the transfer of data with the aid of electromagnetic waves, thus apparently via the medium air (over-the-air, OTA) is sometimes referred to as an air interface. Such an air interface is in particular characterized in that no solid-state transfer medium such as a copper or a glass fiber cable is used, which for the purposes of the following explanations, does not exclude transfer in vacuum. Telecommunications approaches which utilize such a transfer are, for example, over-the-air programming (OTA), over-the-air service provisioning (OTASP), over-the-air provisioning (OTAP) and over-the-air parameter administration (OTAPA).

Of particular significance are the conventional technologies for updating so-called firmware, i.e., software which is embedded in electronic devices. Modifications of the above-named OTA technologies adapted to firmware are summarized in telecommunications under the generic term firmware-over-the-air programming (FOTA).

German Patent Application No. DE 10105454 A1 describes a method for automatically updating software via an air interface, which is used for updating software running on a system, by novel software modules, these software modules initially being tested and application modules subsequently being derived from these software modules.

SUMMARY

The present invention provides a subsystem for a vehicle as well as a vehicle equipped with such a subsystem.

One advantage of this system lies in its modularity as well as in the back-end and on the part of the vehicle. This makes it possible to integrate OEM-specific variants simply, since these functionalities are already separated from one another on the architecture level.

The provided architecture contains the superset of all functionalities and may be adapted as needed by removal. Consequently, existing interfaces may continue to be used, and thus a high development and adaptation rate is ultimately made possible.

Finally, the provided architecture is designed in such a way that it is easily expandable to include additional application. This specifically means that many components may also be utilized for the purpose of reusing them for other applications. Among other things, a diagnosis or field data acquisition may be considered.

BRIEF DESCRIPTION OF THE DRAWINGS

Exemplary embodiments of the present invention are shown in the figures and explained in greater detail below.

FIG. 1 shows the block diagram of a system for updating a vehicle.

FIG. 2 shows the block diagram of a subsystem according to one specific embodiment.

DETAILED DESCRIPTION OF EXAMPLE EMBODIMENTS

FIG. 1 illustrates a system which is made up of a back-end 20 and associated subsystem 30 of a vehicle 10. The essence of the system is made up of the components described below and their interaction.

The data download is separated in one component, which is implemented both as download server 21 in back-end 20 as well as download client 11 in vehicle 10. The device management is separated in one component, which is implemented both as device management server 26 in back-end 20 as well as device management client 16 in vehicle 10. A vehicle-side proxy is utilized to bundle distributed implementations of the device management—for example, in multiple domains—into a single implementation.

The software update and management is separated in one component, which is implemented both as SCOS server 22 and FCOS server 23 in back-end 20 as well as application software update client 12 and firmware update client 13 in vehicle 10. SCOMO/FUMO denotes here the functionality in conformity with OMA-DM as an exemplary implementation.

A vehicle management 25 is used to specify a "device" to vehicle 10 including its relevant topology, i.e., control units and subsystems.

The technical data handling by back-end 20 is separated in a vehicle content management 28, which binds the different versions and variants of data states to the vehicle 10. Also separated is the update logic including the campaign control, which is implemented both as vehicle update server 24 in back-end 20 as well as vehicle update client 14 in vehicle 10.

The data management is separated as content management 18 in vehicle 10. The equivalent applies to the firmware update component separated as an ECU updater in vehicle 10, which may be present in multiple variants and instances—for example, as that of an application software update client 12 or a firmware update client 13—and is capable of updating the different systems and technologies.

The contents and functions of the described components are now explained in detail, reference being made to the preferred variant in FIG. 2 in addition to the basic breakdown according to FIG. 1.

Vehicle management 25 is responsible for the awareness of vehicles 10—within the meaning of a set or a group of vehicles 10—, of vehicle 10 per se and its vehicle topology for all purposes, and is capable of mapping a device on vehicle 10 delivered by device management 15, 16, 26. For this purpose, device management 15, 16, 26 identifies and communicates with a device, not necessarily a vehicle 10 or a known vehicle 10. Multiple devices may be combined to form one vehicle 10. Nevertheless, device management 15, 16, 26 may identify another device type, for example, a lawn mower. Device management 15, 16, 26 consequently identifies the device type in order to allow the forwarding of its management function. In the present example, this is vehicle management 25.

Device management server 26 is capable of carrying out all management actions using the associated device. For this purpose, a protocol is necessary to convey such management objects to and from the device.

Device management 15, 16, 26 is capable of handling multiple devices of different types. Known devices are identified and typified with the aid of data management 27 in order to become a "known device." A known device is sent to the associated management function—in the present case, vehicle management 25. For the purposes of the following explanations, it may be assumed that all devices are typified as "road vehicles" and are processed by vehicle management 25. Nonetheless, the device management is preferably capable of also supporting other types and applications.

Device management client 16 makes it possible to initiate software component management in the associated runtime environment from a device management server 26. The device management driver supports device recognition and parameter configuration by device management client 16. Device management client 16 interacts in turn with one or multiple device management agent(s) 15 in the surroundings, which is/are responsible for carrying out the management activities via an optional device management proxy with the aid of a delivered software component management object. Device management client 16 initiates the general warning mechanism, in order to report the final notification including the status of the management activity.

If multiple instances of device management client 16 exist, this activity is carried out as a best possible alternative by a single instance of device management client 16 and an additional device management agent 15. In order to nevertheless be able to support multiple device management clients 16 in the case of a single device per vehicle 10, a device management proxy is used. Consequently, one instance of device management agent 15 runs on each IP-capable system 46 and utilizes the central proxy of device management client 16.

The device management proxy component makes it possible to avoid multiple instances of device management client 16. For this purpose, each device management agent channels and aggregates the device management management object to device management client 16. The device management agents are able to run in different runtime environments. The proxy is competent and ensures the unambiguous allocation between vehicle 10 and the device.

On the part of back-end 20, vehicle content management 28 is responsible for mapping the content, compressing it for the transfer, if necessary, and packeting it for use with respect to software updates. It receives the data and content from data management 27, which stores the data and content in a coherent way. Thus, the OEM variance with respect to data and content within vehicle 10 is completely covered by data management 27. This also includes the unambiguous semantic and syntactic relationship between the output of data management 27 and associated content management 18 on the part of vehicle 10.

SW component server 22 is responsible for assembling and transferring the management objects for application software updates. In the case of use of OMA-DM, this may be implemented by utilizing the SCOMO protocol and management objects. SW update client 12 is responsible for the execution of SWCOS 22 instructions. It uses the software components delivered to the device and guarantees that warnings transmitting a success or error result are routed back to SW component server 22. In order to nevertheless be able to support multiple SW update clients in the case of a single device per vehicle 10, multiple variants and instances are used. All SW update client instances 12 are in this case orchestrated by vehicle update server 14. Thus, an instance of SW update client 12 may run on any IP-capable system.

Download server 21 is responsible for providing the update packets to be transferred later. Download server 21 obtains its content from vehicle data management 27, coordinated by vehicle update server 24. This ensures that only those update packets are available via download server 21, which are actually used and needed by vehicle 10.

The value-added chain "vehicle update request, content assembly, content provision" via download server 21 is thus carried out only for active vehicles 10 within a defined campaign.

Download client 11 is responsible for downloading software components, firmware or other content into vehicle 10. Download client 11 may support DLOTA or any other air interface 29 based, for example, on http, HTTPS or FTP. Download client 11 preferably has an interface to a content memory 17 via content management 18.

Vehicle update server 24 is responsible for orchestrating the vehicle update process. In other words: It carries out the defined update campaign or the defined update campaigns. The specification of the campaign for a certain vehicle 10, which was originally written by the OEM data and service management, may be obtained from data management 27. This specification combines the necessary services and processes into a resulting update process. If vehicle 10 is recognized and noted by vehicle management 25, its condition and status are continuously monitored by data management 27.

Vehicle update client 14 is responsible for carrying out the requirements of vehicle update server 24. Vehicle update client 14 thus coordinates the vehicle update process or any part of it—application software updates included—for vehicle 10. To make flexibility and a simple connection to existing technologies possible, vehicle update client 14 also implements a management interface to the device management. Furthermore, vehicle update client 14 takes over the responsibility for the downloaded content, receives the part relating to vehicle 10—for example, the update process data and other auxiliary information—and delegates update and content to client 12 or 13. If, for example, OMA-DM is used, FUMO and/or SCOMO objects may be used.

On the part of back-end 20, data management 27 is responsible for delivering consistent data and content to the services.

Content management 18 is responsible for persistently storing any type of content within vehicle 10. It is used as it were as network-attached storage (NAS) of vehicle 10 including the capability of loading the data from a Web source. Multiple instances of a content memory 17 may exist within vehicle 10 and are managed by content management 18. Content management 18 is concerned with storage, depackaging of data and assembly of data and may be used for any type of application within vehicle 10.

Content memory 17 is responsible for persistently storing any type of content within the control unit (electronic control unit, ECU). It is quasi used as a character device file (raw device). Multiple instances of content memory 17 may exist within vehicle 10 and are managed by content management 18. Content memory 17 is concerned with the storage and may be used for any type of application within vehicle 10.

Control unit update client 12 or 13 is responsible for executing the application software or firmware updates for a certain control unit or a certain sub-area. Control unit update client 12 or 13 functions as a client and is connected to vehicle update client 14. It manages application software 12 or firmware 13 update process including the rollback for a certain control unit or a certain sub-area. It is furthermore responsible for making the state of the control unit or sub-area known at any time.

What is claimed is:

1. A subsystem for a vehicle, comprising:
a device management client, situated in the vehicle, for exchanging device, vehicle, diagnostic and software update information, the device management client being connectable to a device management server of a back-end via an air interface;
a plurality of device management agents, situated in the vehicle, each of the device management agents executing in a different runtime environment relative to the others of the device management agents, each of the device management agents aggregating and channeling device management objects to the device management client;
a download client, situated in the vehicle, for downloading a software update from the back-end into the vehicle, the download client being connectable to a download server of the back-end via an air interface;
software update clients for applying the software update, the software update clients being connectable to the download client; and
a vehicle update client for coordinating the software update, the vehicle update client being connectable to the download client and the software update clients;
wherein the device management client and the download client are separate components relative to one another, and wherein the device management server and the download server are separate components relative to one another.

2. The subsystem as recited in claim 1, wherein the device management client manages a device of the vehicle, and guides the device management, wherein the device management client is connected to the vehicle update client.

3. The subsystem as recited in claim 1, wherein the device management client manages a device of the vehicle.

4. The subsystem as recited in claim 1, further comprising:
at least one content memory for storing the software update; and
a content management for managing the content memory, the content management being connected to the download client, the software update clients and the vehicle update client.

5. The subsystem as recited in claim 1, wherein the software update clients include at least one application software update client and at least one firmware update client.

6. The subsystem as recited in claim 5, further comprising:
a vehicle electronics domain including at least the firmware update client;
an entertainment electronics domain including at least the download client; and
a secured communication connecting the vehicle electronics domain and the entertainment electronics domain.

7. The subsystem as recited in claim 6, further comprising:
at least one embedded system included by the vehicle electronics domain; and
at least one IP-capable system included by the vehicle electronics domain.

8. The subsystem as recited in claim 7, wherein:
the embedded system includes at least one central gateway or an engine control or a driving transmission of the vehicle and is consistent with an open vehicle system architecture;
the IP-capable system includes at least the firmware update client and an entertainment electronics proxy;
the entertainment electronics domain includes a security profile of at least the download client, an application security engine and a vehicle electronics proxy; and
the secured communication connects the entertainment electronics proxy and the vehicle electronics proxy.

9. The subsystem as recited in claim 7, wherein:
the vehicle electronics domain includes an operating system adapted to the vehicle electronics domain, which carries out the entertainment electronics proxy; and
the entertainment electronics domain includes an operating system adapted to the entertainment electronics domain, which carries out the vehicle electronics proxy.

10. The subsystem as recited in claim 8, wherein the entertainment electronics domain further includes a control unit update client carried out by the operating system, which is adapted to the entertainment electronics domain.

11. A vehicle including a subsystem, the subsystem including:
a device management client, situated in the vehicle, for exchanging device, vehicle, diagnostic and software update information, he device management client being connectable to a device management server of a back-end via an air interface;
a download client, situated in the vehicle, for downloading a software update from the back-end into the vehicle, the download client being connectable to a download server of the back-end via an air interface;
a plurality of device management agents, situated in the vehicle, each of the device management agents executing in a different runtime environment relative to the others of the device management agents, each of the device management agents aggregating and channeling device management objects to the device management client;
software update clients for applying the software update, the software update clients being connectable to the download client; and
a vehicle update client for coordinating the software update, the vehicle update client being connectable to the download client and the software update clients;
wherein the device management client and the download client are separate components relative to one another, and wherein the device management server and the download server are separate components relative to one another.

* * * * *